United States Patent
Dudar et al.

(10) Patent No.: US 9,284,924 B2
(45) Date of Patent: Mar. 15, 2016

(54) VEHICLE REFUELING DETECTION METHOD UTILIZING HYDROCARBON SENSOR

(71) Applicant: Ford Global Technologies, LLC, Dearborn, MI (US)

(72) Inventors: Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 14/071,118

(22) Filed: Nov. 4, 2013

(65) Prior Publication Data
US 2015/0121999 A1 May 7, 2015

(51) Int. Cl.
*G01M 15/04* (2006.01)
*F02M 25/08* (2006.01)
*F02D 41/22* (2006.01)
*F02D 41/00* (2006.01)

(52) U.S. Cl.
CPC ......... *F02M 25/089* (2013.01); *F02D 41/0045* (2013.01); *F02D 41/221* (2013.01); *F02D 2041/225* (2013.01); *Y10S 903/904* (2013.01)

(58) Field of Classification Search
CPC .. F02D 2041/225; F02M 25/89; G01M 15/04
USPC ............................ 73/47, 49.7, 114.38, 114.39
See application file for complete search history.

(56) References Cited

U.S. PATENT DOCUMENTS

| | | | |
|---|---|---|---|
| 3,801,973 A | 4/1974 | Grabiel et al. | |
| 5,111,795 A | 5/1992 | Thompson | |
| 5,186,153 A | 2/1993 | Steinbrenner et al. | |
| 5,249,561 A | 10/1993 | Thompson | |
| 5,456,238 A | 10/1995 | Horiuchi et al. | |
| 5,925,817 A * | 7/1999 | Kidokoro et al. | 73/40 |
| 6,161,424 A | 12/2000 | Kidokoro et al. | |
| 6,378,505 B1 | 4/2002 | Doering et al. | |
| 6,994,075 B2 | 2/2006 | Penschuck | |
| 2004/0226543 A1 | 11/2004 | Penschuck | |
| 2007/0101973 A1 | 5/2007 | Wolber et al. | |
| 2011/0265768 A1 | 11/2011 | Kerns et al. | |
| 2012/0116620 A1 | 5/2012 | Wang et al. | |

(Continued)

FOREIGN PATENT DOCUMENTS

EP 2628926 A2 8/2013

OTHER PUBLICATIONS

Sultan, M. et al., "Closed Loop Canister Purge Control System," SAE Technical Paper No. 980206, 1998, 10 pages.
Jentz, Robert Roy et al., "Engine-Off Refueling Detection Method," U.S. Appl. No. 13/788,624, filed Mar. 7, 2013, 32 pages.
(Continued)

*Primary Examiner* — Eric S McCall
(74) *Attorney, Agent, or Firm* — James Dottavio; Alleman Hall McCoy Russell & Tuttle LLP

(57) ABSTRACT

Embodiments for detecting fuel events are presented. In an embodiment, a method comprises performing an action responsive to a fuel event indicated based on output from a hydrocarbon sensor positioned between a fuel tank and a fuel vapor canister. In this way, the hydrocarbon sensor may be used to detect fuel events and engine operation may be adjusted accordingly.

19 Claims, 7 Drawing Sheets

(56) References Cited

U.S. PATENT DOCUMENTS

| | | |
|---|---|---|
| 2012/0152210 A1 | 6/2012 | Reddy et al. |
| 2014/0360260 A1* | 12/2014 | Dudar et al. ............... 73/204.11 |
| 2015/0068498 A1* | 3/2015 | Peters et al. ................. 123/520 |
| 2015/0090233 A1* | 4/2015 | Dudar et al. ................. 123/520 |
| 2015/0114089 A1* | 4/2015 | Dudar et al. ..................... 73/40 |

OTHER PUBLICATIONS

Pursifull, Ross Dykstra, "Method and System for Vacuum Generation," U.S. Appl. No. 13/802,020, filed Mar. 13, 2013, 43 pages.

Yang, Dennis Seung-Man et al., "Fuel System Control," U.S. Appl. No. 13/922,059, filed Jun. 19, 2013, 39 pages.

* cited by examiner

VEHICLE REFUELING DETECTION METHOD UTILIZING HYDROCARBON SENSOR

FIELD

The present disclosure relates to systems and methods for operation of on-board fuel vapor recovery systems.

BACKGROUND AND SUMMARY

Hybrid vehicle fuel systems may include a sealed fuel tank configured to withstand high fuel tank pressure and vacuum levels. Fuel tank pressure or vacuum levels may build up due to engine operating conditions as well as the generation of diurnal vapors over vehicle drive cycles. These hybrid vehicle fuel systems may include a fuel tank isolation valve or other similar valves to seal the fuel tank off from the atmosphere and ensure fuel vapors do not leak. However, during refueling or when the pressure inside the fuel tank reaches the capacity of the fuel tank, the fuel tank vapors may be released into and stored in a fuel vapor canister packed with an adsorbent by opening the fuel tank isolation valve, coupled between the fuel tank and the canister. At a later time, such as when the engine is in operation, the stored vapors can be purged into the engine intake manifold for use as fuel. These systems may include a hydrocarbon sensor to monitor the concentration of hydrocarbons being released to the canister, in order to determine the hydrocarbon load on the canister, for example.

The inventors herein have recognized that the hydrocarbon sensor may be used during other operating periods to detect a fuel event. For example, a sudden spike in hydrocarbon concentration, particularly during an engine off period where no canister purge is being performed, may indicate that fuel vapors from the fuel tank are being displaced to the canister due to or in preparation for a fuel tank refueling event. Accordingly, in one embodiment, a method comprises performing an action responsive to a fuel event indicated based on output from a hydrocarbon sensor positioned between a fuel tank and a fuel vapor canister.

In this way, output from the hydrocarbon sensor may be used to detect a fuel event. In one example, the fuel event may include a fuel tank refill event where fuel is pumped to the fuel tank from an external fuel source. During such conditions, fuel vapors present in the fuel tank, as well as fuel vapors introduced during the fuel tank refill, may be displaced by the fuel volume to the fuel vapor canister. These displaced fuel vapors may pass by the hydrocarbon sensor prior to reaching the canister. If the hydrocarbon sensor senses a sudden increase the concentration of hydrocarbons in the vapor flow, it may indicate a fuel tank refill event is occurring. As such, if an engine-off leak detection test is being performed or is about to be performed, it may be aborted to prevent false positive or false negative readings caused by the pressure disturbance of the fuel tank refill.

In another example, the fuel event may include completion of a depressurization of the fuel tank preceding a refueling event. As explained above, the engine in a hybrid vehicle may be operated infrequently, leading to few opportunities to purge fuel tank vapors to the engine. As a result, the fuel tanks of the hybrid vehicles may be configured to store fuel vapors at relatively high pressure. Therefore, hybrid vehicle fuel systems may include locking fuel doors that are opened only after the fuel tank has been depressurized, to prevent leakage of fuel vapors and mist to the atmosphere. Accordingly, following an indication from an operator of the vehicle that a refueling event is about to occur, the fuel tank isolation valve or other fuel tank venting valve may be opened to relieve the pressure out of the fuel tank. The fuel vapors in the tank may be routed to the canister, past the hydrocarbon sensor. Thus, if the hydrocarbon sensor senses an increase in hydrocarbon concentration subsequent to the refueling request and/or the opening of the fuel tank isolation valve, followed by a leveling off of the hydrocarbon concentration, it may indicate that the depressurization of the fuel tank is complete, and the fuel door may be unlocked to allow the refueling to begin.

Thus, the hydrocarbon sensor present in the hybrid vehicle fuel system may be advantageously used to determine whether the fuel tank is being refilled or whether a depressurization of the fuel tank is complete. In doing so, diagnostic leak routines may be performed with high fidelity and/or vehicle emissions may be reduced by reducing the likelihood fuel vapors will leak to atmosphere during a refueling event. Further, the hydrocarbon sensor may act as a back-up sensor to other fuel tank sensors that have previously been used to detect fuel tank events (such as a fuel tank pressure sensor). As such, if the other sensors degrade, the fuel tank events may continue to be detected via the hydrocarbon sensor. Additionally, output from the hydrocarbon sensor may be used during the fuel tank event as a rationality check to ensure the fuel system valves and sensor are functioning as intended.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Evaporative emission (EVAP) system diagnostic leak detection tests that monitor fuel system pressure and/or vacuum have been used. EVAP diagnostic leak detection tests may be conducted during engine-off conditions because fuel system pressure disturbances, such as fuel slosh, arising from regular vehicle operation may be absent. A typical diagnostic leak detection test may seal the EVAP system by closing the canister vent valve (CVV) and then monitor changes in fuel system vacuum and/or pressure to determine system integrity when the engine is off. However, if refueling is started during an engine-off diagnostic leak detection test, the ensuing increase in fuel system pressure due to the dispensed fuel may confound the results of the diagnostic leak detection test. Furthermore, the buildup in fuel system pressure may prematurely shutoff the fuel dispensing pump.

Additionally, during refueling of a fuel tank, a fuel door may be maintained locked until sufficient depressurization has occurred to disable refueling of a pressurized fuel tank. A fuel tank pressure sensor may be used to determine if there is excess pressure or vacuum build-up in the fuel tank, and if depressurization is required. During the depressurization, fuel tank vapors may be released into and stored in a fuel vapor canister packed with an adsorbent by opening a valve coupled between the fuel tank and the canister. At a later time, when the engine is in operation, the stored vapors can be purged into the engine intake manifold for use as fuel.

In one example, shown below in FIGS. 1-2, a hybrid vehicle may include a fuel system having a hydrocarbon sensor positioned between a fuel tank and a fuel vapor canister. The above-described fuel tank refill and fuel tank depressurization events may be detected based on output from the hydrocarbon sensor. A controller may be configured to perform a control routine, such as the methods of FIGS. 3-5, in order to perform an action (e.g., abort a leak detection routine or unlock a fuel door) in response to a fuel event indicated based on output from the hydrocarbon sensor. FIGS. -76 are timelines that illustrate parameters of interest during the methods of FIGS. 3-5, for example.

Figure 1:
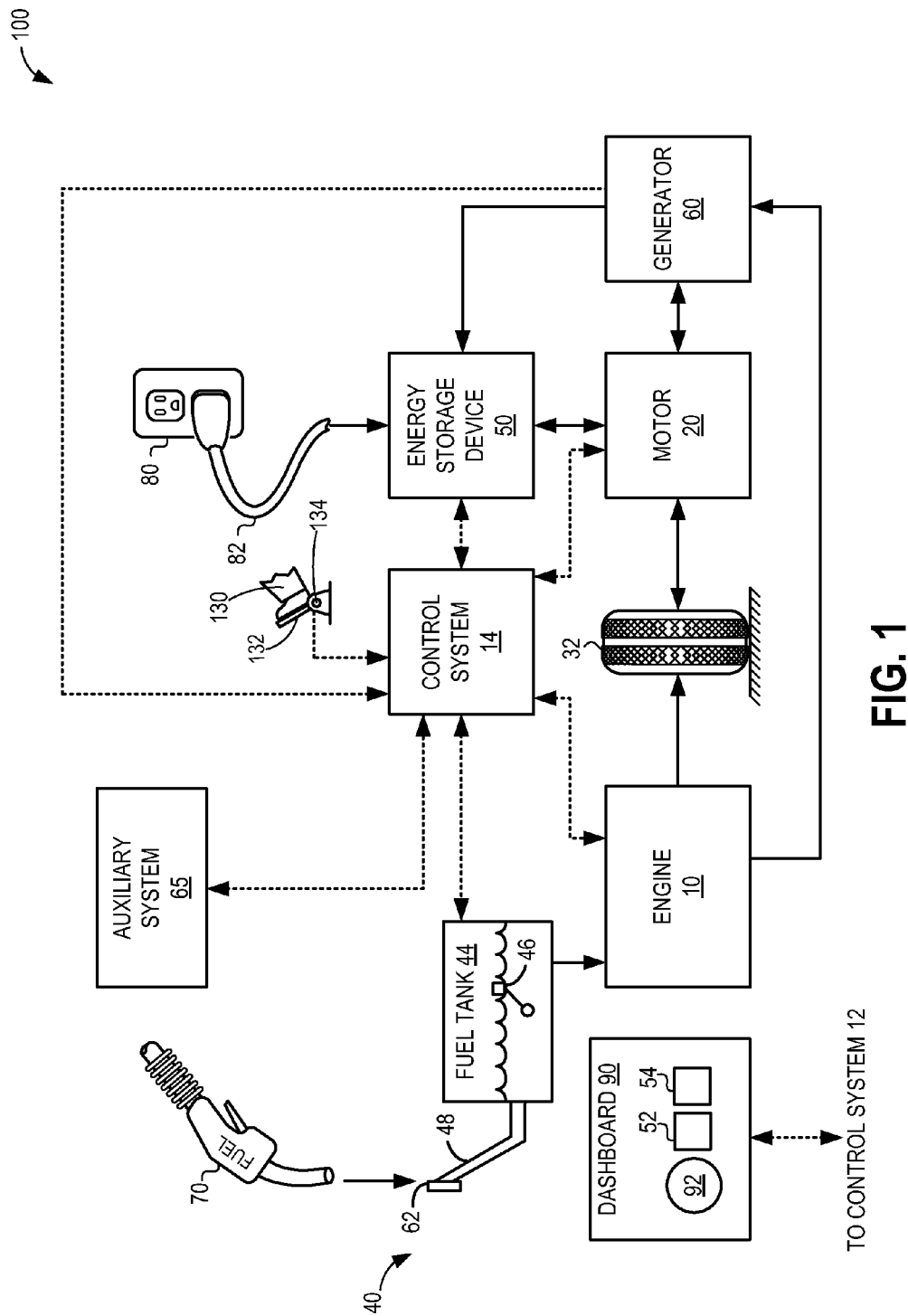
FIG. 1 illustrates an example hybrid vehicle system.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 32 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52.

Vehicle system 100 may include a fuel door 62 located on an outer body of the vehicle for receiving fuel from an external fuel source. Fuel door 62 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events.

In response to a fuel level in the fuel tank falling below a threshold, as indicated by fuel gauge 52, a fuel tank refill request may be made by a vehicle operator. The operator may indicate a desire to refill fuel tank 44 by actuating refuel button 92 positioned on a dashboard 90 of the vehicle system. The vehicle operator may also stop the vehicle for refilling. As elaborated with reference to FIGS. 2-3, in response to the refueling request, it may be determined if there is excess pressure or vacuum in the fuel tank. If so, depressurization of the fuel tank may be performed by relieving the excess pressure/vacuum to the atmosphere and/or engine intake before the fuel door can be unlocked. As such, fuel tank pressure/vacuum may develop due to diurnal temperature cycles at the engine. Following pressure relief, the fuel door may be unlocked enabling the vehicle operator to fill the fuel tank. Fuel may be pumped into the fuel tank from fuel dispensing device 70 via a refueling line 48 that forms a passageway from fuel door 62. By delaying fuel door unlocking until the fuel tank has depressurized to ambient pressure conditions, the operator may be protected from getting sprayed with a fuel mist when the fuel door is opened. In addition, fuel vapors are not released into the environment improving vehicle emissions.

Vehicle system 100 may include an auxiliary system 65. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 14 of the vehicle and a global positioning satellite via wireless communication.

In one example, fuel gauge 52, refuel button 92, auxiliary system 65, as well as odometer 54 may be coupled to the vehicle's dashboard 90. For example, the various sensors and gauges may be coupled to a message center (not shown) on the vehicle's dashboard. The message center may include indicator light(s) and/or a text-based display in which messages are displayed to an operator, such as a message requesting an operator input to refill the fuel tank or start the engine. Alternatively, the dashboard may be configured with a touch interactive display for touch and text interaction between the vehicle control system and the vehicle operator.

Control system 14 may communicate with one or more of engine 10, motor 20, fuel system 40, energy storage device 50, and generator 60. Specifically, control system 14 may receive feedback from one or more of engine 10, motor 20, fuel system 40, energy storage device 50, and generator 60 and send control signals to one or more of them in response. Control system 14 may also receive an indication of an operator requested output of the vehicle propulsion system from a vehicle operator 130. For example, control system 14 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 14 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
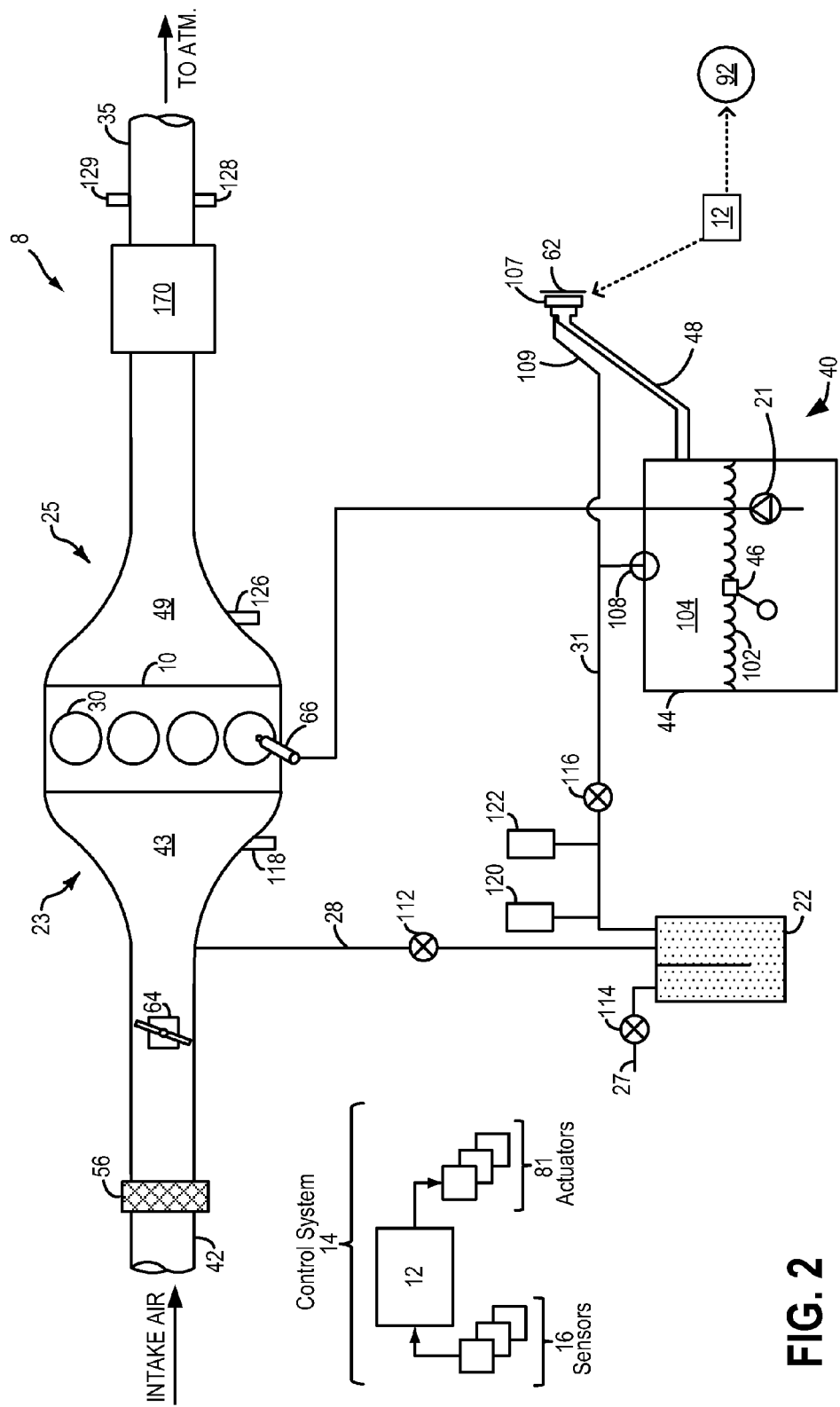
FIG. 2 shows a schematic depiction of an engine system coupled in the vehicle system of FIG. 1.

FIG. 2 shows a schematic depiction of an engine system 8 coupled in a hybrid vehicle system, such as vehicle system 100 of FIG. 1. As such, vehicle and engine components previously introduced in FIG. 1 are numbered similarly in FIG. 2 and not reintroduced.

Engine system 8 may include an engine 10 (such as engine 10 of FIG. 1) having a plurality of cylinders 30. Engine 10 includes an engine intake 23 and an engine exhaust 25. Engine intake 23 includes an air intake throttle 64 fluidly coupled to the engine intake manifold 43 via an intake passage 42. Air may enter intake passage 42 via air filter 56. Engine exhaust 25 includes an exhaust manifold 49 leading to an exhaust passage 35 that routes exhaust gas to the atmosphere. Engine exhaust 25 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown), having an intake compressor driven by an exhaust turbine.

Engine system 8 is coupled to fuel system 40. Fuel system 40 includes a fuel tank 44 coupled to a fuel pump 21 and a fuel vapor canister 22. Fuel tank 44 receives fuel via a refueling line 48, which acts as a passageway between the fuel tank 44 and a refueling door 62 on an outer body of the vehicle. During a fuel tank refueling event, fuel may be pumped into the vehicle from an external source through refueling inlet 107 which is normally covered by a gas cap. During a refueling event, while fuel is pumped into fuel tank 44, one or more fuel tank vent valves may be opened to allow refueling vapors to be directed to, and stored in, canister 22.

Fuel pump 21 is configured to pressurize fuel delivered to the injectors of engine 10, such as example injector 66. While only a single injector 66 is shown, additional injectors are provided for each cylinder. It will be appreciated that fuel system 40 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest. Further, during conditions when fuel tank vacuum is elevated, the engine may be actively pulled-down, or deactivated, so as to enable the fuel tank vacuum to be vented to the deactivated engine.

Vapors generated in fuel tank 44 may be routed to fuel vapor canister 22, via conduit 31, before being purged to engine intake 23. Fuel tank 44 may include one or more vent valves for venting diurnals and refueling vapors generated in the fuel tank to fuel vapor canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism which, when displaced by fuel, shuts off the vapor flow between the fuel tank and the canister. Thus, based on a fuel level 102 relative to vapor space 104 in the fuel tank, the vent valve may be open or closed. For example, FLVV 108 may be normally open allowing fuel tank overfilling to be prevented. In particular, during fuel tank refilling, when a fuel level 102 is raised, vent valve 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23, specifically intake manifold 43, via purge line 28 by opening canister purge valve 112. While a single canister 22 is shown, it will be appreciated that fuel system 18 may include any number of canisters.

Canister 22 further includes a vent 27 (herein also referred to as a fresh air line) for routing gases out of the canister 22 to the atmosphere when storing, or trapping, fuel vapors from fuel tank 44. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere. As elaborated below and with reference to FIG. 3, canister vent valve 114 and purge valve 112 may be closed during a diagnostic routine to detect a leak in the fuel system. For example, when both the canister vent vale 114 and purge valve 112 are closed, the fuel system is sealed from atmosphere. Pressure or vacuum may be applied to or may build naturally in the fuel system, and a less than or greater than expected change in pressure or vacuum may indicate the presence of a leak in the system.

Hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, in some embodiments, a fuel tank isolation valve (FTIV) 116 may be optionally included in conduit 31 such that fuel tank 44 is coupled to canister 22 via FTIV 116. When included, the isolation valve may be kept closed during engine operation so as to limit the amount of diurnal vapors directed to canister 22 from fuel tank 44. During refueling operations, and selected purging conditions, the isolation valve may be temporarily opened to direct fuel vapors from the fuel tank 44 to canister 22. By opening the valve when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and canister 22, in alternate embodiments, the pressure sensor may be directly coupled to fuel tank 44.

Further, a hydrocarbon sensor 122 may be present in fuel system 40 to indicate the concentration of hydrocarbons in the vapor flow into the fuel vapor canister 22. As illustrated, hydrocarbon sensor 122 is positioned in conduit 31, downstream of fuel tank 44 and upstream of canister 22. Specifically, hydrocarbon sensor 122 is positioned in conduit 31 between fuel vapor canister 22 and FTIV 116. The probe (e.g., sensing element) of hydrocarbon sensor 122 is exposed to and senses the hydrocarbon concentration of the vapor flow in conduit 31 as the vapor flows between the fuel tank 44 and fuel vapor canister 22. The hydrocarbon sensor 122 is separate from both the fuel tank 44 and fuel vapor canister 22. As described in further detail below with respect to FIGS. 3-5, the concentration of hydrocarbons in the fuel vapor flow determined by hydrocarbon sensor 122 may be used by the engine control system 14 for a variety of applications, including but not limited to determining a hydrocarbon load on the canister 22 and detecting a fuel event, such as detecting a fuel tank refill and/or detecting a fuel tank depressurization.

A vehicle operator may indicate a refueling request (or desire to refill fuel tank 44) to the vehicle controller 12 via the actuation of a refuel button 92 located on a vehicle dashboard. Based on the refueling input from refuel button 92, and further based on a fuel tank pressure estimate, controller 12 may determine whether to unlock fuel door 62 immediately or delay the unlocking. As such, during all conditions other than refueling, fuel door 62 may be held locked so as to contain fuel vapors in the fuel tank and reduce the release of hydrocarbons into the atmosphere. Given that fuel tank 44 is part of a sealed fuel system, due to diurnal temperature cycles of the engine and vehicle, there may be fluctuations in the fuel tank pressure. For example, based on ambient temperatures experienced and vehicle operating conditions, excess fuel tank pressure or excess fuel tank vacuum conditions may occur. Prior to enabling refilling of the tank, fuel tank depressurization may be necessary. Otherwise, when the vehicle operator opens the refuel door and tank cap, fuel mist may be sprayed on the operator. In addition, hydrocarbon emissions from the vehicle are increased. As such, the output of pressure sensor 120 may provide an indication of fuel tank pressurization. For example, if a fuel tank pressure level (or vacuum level) is higher than a threshold, it may be determined that the fuel tank needs to be depressurized. However, there may be conditions when the FTPT is degraded. For example, the FTPT may have gone bad or may be stuck in a range. In either case, there is a danger that the FTPT may indicate normal fuel tank pressure conditions when there is actually excess fuel tank pressure conditions. In such an event, the engine controller may not have an actual estimate of the pressure magnitude in the tank and may enable unlocking of the fuel door prematurely, or disable unlocking of the fuel door indefinitely.

The inventors herein have therefore identified an alternate (e.g., back-up or secondary) approach for reliably verifying fuel tank depressurization. In response to the operator's refueling request, FTIV 116 may be opened with canister vent valve 114 open. Fuel vapors in the fuel tank 44 may flow through canister 22, where they are stripped of hydrocarbons and the air pushed to atmosphere. When the vapor flows to the canister 22 from the fuel tank 44, it may travel past the hydrocarbon sensor 122. Thus, a temporary spike in hydrocarbon concentration (if the fuel tank is pressurized) or a temporary drop in hydrocarbon concentration (if the fuel tank is under vacuum) may occur following the opening of the FTIV 116, which is sensed by the hydrocarbon sensor. Once the change in hydrocarbon concentration levels off (e.g., the sensor stops responding), it may be assumed the fuel tank is depressurized. Accordingly, the fuel door may be unlocked to allow the vehicle operator to refill the fuel tank. In this way, reliable depressurization information is received during refueling even if the FTPT is degraded.

Fuel vapors released from canister 22 during a purging operation may be directed into engine intake manifold 43 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold air flow (MAF) may be obtained from MAF sensor 118 coupled to intake manifold 43, and communicated with controller 12. Alternatively, MAF may be inferred from alternate engine operating conditions, such as mass air pressure (MAP), as measured by a MAP sensor (not shown) coupled to the intake manifold.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 and FTIV 116 to direct refueling and diurnal vapors into canister 22 while preventing fuel vapors from being directed into the intake manifold.

As another example, the fuel system may be operated in a refueling mode (e.g., when fuel tank refueling is requested by a vehicle operator), wherein the controller 12 may adjust the valves to depressurize the fuel tank before enabling fuel to be added therein. Therein the controller 12 may close CVV 114 and open each of CPV 112 and FTIV 116 to direct excess fuel tank pressure/vacuum into the intake manifold via the canister.

As yet another example, the fuel system may be operated in a canister purging mode (e.g., after an emission control device light-off temperature has been attained and with the engine running), wherein the controller 12 may open canister purge valve 112, canister vent valve 114, and close FTIV 116. By closing the FTIV, the canister can be purged more efficiently during the limited engine-on time that is available in a hybrid vehicle. During this mode, vacuum generated by the intake manifold of the operating engine may be used to draw fresh air through vent 27 and through fuel vapor canister 22 to purge the stored fuel vapors into intake manifold 43. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAF sensor 118, pressure sensor 120, hydrocarbon sensor 122, and exhaust pressure sensor 129. Other sensors such as additional pressure, temperature, air/fuel ratio, and composition sensors may be coupled to various locations in the vehicle system 6. As another example, the actuators may include fuel injector 66, canister purge valve 112, canister vent valve 114, FTIV 116, and throttle 64. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-5.

In this way, a fuel system comprises a fuel tank storing fuel for an engine; a fuel vapor canister coupled to the fuel tank via a conduit; a hydrocarbon sensor positioned in the conduit between the fuel tank and the fuel vapor canister; and a controller storing non-transitory instructions to perform an action responsive to a fuel event indicated based on output from the hydrocarbon sensor.

The fuel system may further comprise a canister purge valve coupling the fuel vapor canister to an intake manifold of the engine and a canister vent valve coupling the fuel vapor canister to atmosphere. The controller may store further instructions to perform a fuel system leak detection test by closing the canister vent valve and the canister purge valve and monitoring a subsequent change in fuel system pressure. The controller may store further instructions to, after the fuel system leak detection test is initiated, abort the fuel system leak detection test responsive to the fuel event.

In an example, the fuel event may be a fuel tank fill event. The controller may store further instructions to indicate the fuel tank fill event is occurring when output from the hydrocarbon sensor indicates a hydrocarbon concentration in vapor flow from the fuel tank to the fuel vapor canister has increased by a threshold amount.

In another example, the action may be opening a fuel door and the fuel tank event may be completion of a fuel tank depressurization. The fuel system may further comprise a fuel tank isolation valve positioned in the conduit between the fuel tank and the hydrocarbon sensor; and a refuel button on a vehicle dashboard for receiving an operator request for refueling.

The controller may store instructions to, in response to the operator request for refueling, command open the fuel tank isolation valve; and delay unlocking of the fuel door until an indication of the fuel tank depressurization being completed is received. The fuel tank depressurization being complete may be indicated based on a hydrocarbon concentration in vapor flow from the fuel tank to the fuel vapor canister measured by the hydrocarbon sensor changing by a first threshold rate and then changing by less than a second threshold rate.

Figure 3:
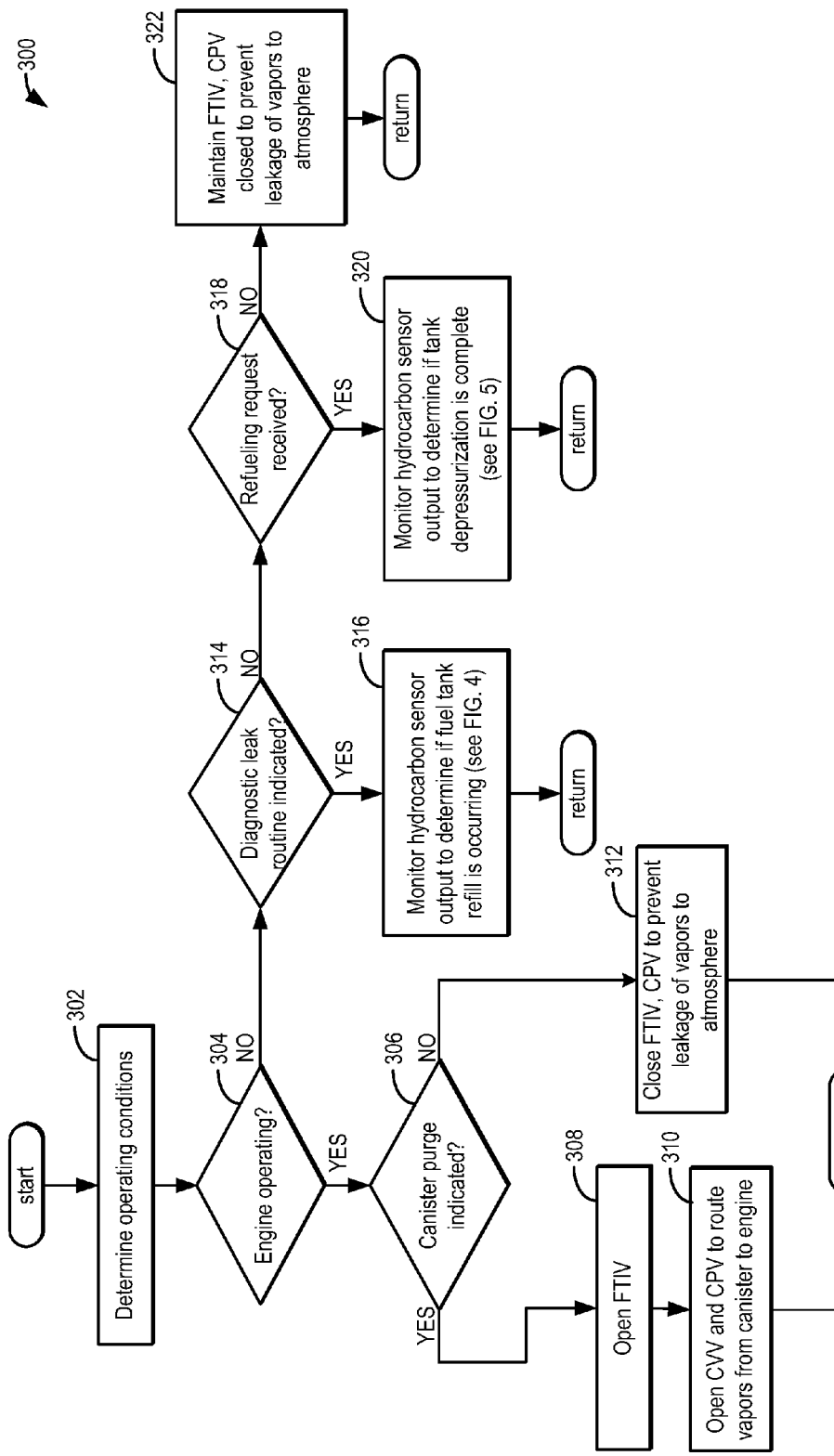
FIGS. 3-5 are flow diagrams illustrating methods for detecting fuel tank events according to embodiments of the disclosure.

Now turning to FIG. 3, an example method 300 is shown for detecting a fuel event based on output from a hydrocarbon sensor positioned between a fuel tank and a fuel vapor canister. For example, method 300 may be carried out by controller 12, according to non-transitory instructions stored thereon, to detect an event of fuel tank 44 based on feedback from hydrocarbon sensor 122, positioned in conduit 31 between fuel tank 44 and fuel vapor canister 22. At 302, method 300 includes determining operating parameters. The determined operating parameters include, but are not limited to, engine operating status (e.g., if the engine is on or off), hydrocarbon load on the fuel vapor canister, the position of each of the FTIV, CVV, CPV, and/or other valves, and other parameters.

At 304, it is determined if the engine is operating. Engine operation may be based on fuel injection status (e.g., whether fuel is being injected to the engine), vehicle propulsion mode (e.g., electric motor or engine), etc. If the engine is not operating, method 300 proceeds to 314, which will be described below. If the engine is operating, method 300 proceeds to 306 to determine if a fuel vapor canister purge is indicated. The fuel vapor canister traps hydrocarbons from the fuel vapors pushed to the canister during refueling, for example. If the canister becomes overloaded (e.g., all the storage capacity of the canister is taken by trapped hydrocarbons), hydrocarbons may be leaked to the atmosphere. Thus, the canister may be periodically purged by opening the canister purge valve to draw fresh air through the canister and to the intake manifold. A canister purge may be indicated if the engine is operating, a threshold time since a previous purge has been performed, and/or if the load on the canister is above a threshold load. If a purge is indicated, method 300 proceeds to 308 to open the FTIV and then to 310 to open the CPV and the CVV. By opening the FTIV, CPV, and CVV, fresh air is drawn through the canister to strip the canister of hydrocarbons. The vacuum of the intake manifold acts to draw in the fresh air and fuel vapors to the engine. Method 300 then ends.

If a canister purge is not indicated, method 300 proceeds to 312 to close (or maintain closed) the FTIV and CPV to prevent leakage of fuel vapors to the atmosphere. The CVV may be kept open in some examples to allow fuel vapors, stripped of hydrocarbons via passage through the canister, to be pushed to the atmosphere. Method 300 then ends.

Returning to 304, if it is determined the engine is not operating, method 300 proceeds to 314 to determine if a diagnostic leak detection routine is being performed. The diagnostic leak routine may be performed periodically when the engine is shutdown, and may be preferentially performed when the vehicle is not moving. For example, the diagnostic leak routine may be performed after every engine shutdown, after every 10 engine shutdowns, or another suitable time period.

During engine-off conditions, CPV 112 may be closed and CVV 114 may be open or closed. A diagnostic leak detection test may be performed during engine-off conditions by monitoring the fuel tank pressure and/or the rate of change in fuel tank pressure over a predetermined period. CVV 114 may be closed during the predetermined period in order to isolate the fuel system during pressure and/or vacuum monitoring. Alternately, CVV 114 may be opened, for example momentarily opened for adjusting the fuel system pressure prior to pressure and/or vacuum monitoring. The fuel system pressure may increase or decrease after the engine is shut off during diagnostic leak detection testing. For example, if the vehicle is parked outdoors during hot and sunny weather, the fuel tank pressure may increase during engine-off conditions. As another example, if a warm vehicle is parked in garage or in cold wintry weather, the fuel tank pressure may decrease during engine-off conditions. Furthermore, when performing the diagnostic leak detection test, the change in fuel tank pressure or rate of change in fuel tank pressure may be greater when CVV 114 (or another device that restricts fluid flow in the fuel system) is closed as compared to when CVV 114 is opened.

If the diagnostic leak detection testing is on, method 300 continues at 316 where it monitors hydrocarbon concentration in the vapor flow between the fuel tank and the canister, based on output from the hydrocarbon sensor, to determine if a refueling event is occurring, as described in more detail below with respect to FIG. 4.

If diagnostic leak detection testing is off, method 300 proceeds to 318, to determine if a refueling request (without a diagnostic leak test being performed) is present. The refueling request may include an operator request for refueling being received via operator actuation of a refueling button on a dashboard of the hybrid vehicle. If a refueling request is received, method 300 proceeds to 320 to monitor fuel tank depressurization based on output from the hydrocarbon sensor, as will be explained in more detail below with respect to FIG. 5. If no operator request for refueling is received, method 300 proceeds to 322 to maintain the FTIV and CPV closed to prevent leakage of fuel vapors to the atmosphere, and then method 300 ends.

Figure 4:
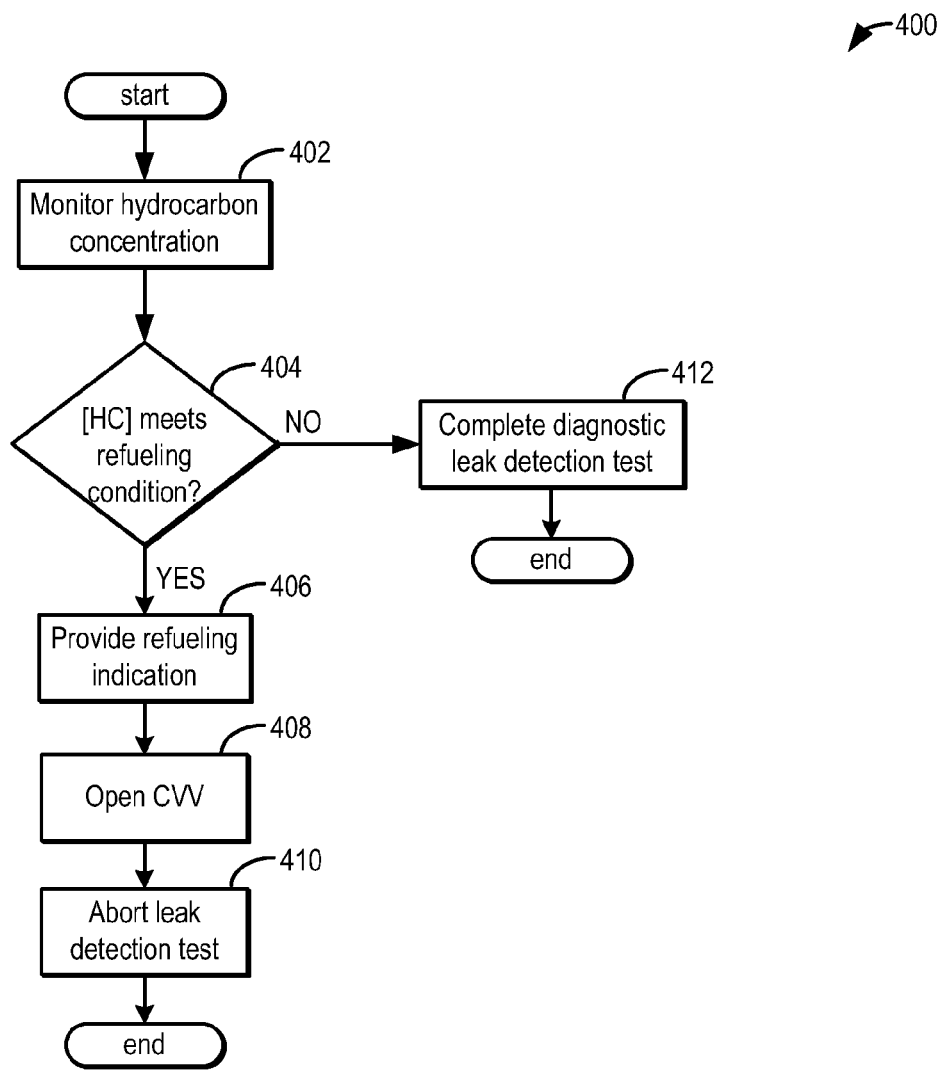

Turning now to FIG. 4, a method 400 for detecting a fuel tank refill event is presented. Method 400 may be performed in response to an indication that a diagnostic leak detection routine is being performed or is about to be performed. Method 400 includes, at 402, monitoring hydrocarbon concentration in the conduit between the fuel tank and the fuel vapor canister using a hydrocarbon sensor. At 404, it is determined if the hydrocarbon concentration meets a refueling condition. The refueling condition may include the rate of change in hydrocarbon concentration [HC] being greater than a first threshold. The rate of change may be determined from HC data collected over a threshold time within a predetermined time interval. The refuel conditions may further include [HC] being greater than a second threshold over the predetermined period of time interval. For example, refueling may cause hydrocarbon concentration to increase as fuel is added to the fuel tank. Accordingly, if the rate of change in

[HC] is greater than a first threshold, and/or [HC] increases above a second threshold during a predetermined time interval, then the refueling condition may be satisfied.

If the refuel condition is satisfied, method 400 continues at 406, where a refueling event indication is provided. For example, a refueling flag may be set to 1, indicating that an engine-off refueling event has been performed. Upon restarting the engine, a refueling indication may be provided to the vehicle operator. As a further example, the refueling indication may also be provided to a vehicle adaptive fuel strategy, or may be provided to update a dashboard instrument cluster display at the next engine-on condition. After providing a refueling indication, the CVV 114 is opened at 408. Opening CVV 114 allows for vapor in the fuel tank to be purged as fuel is dispensed during refueling into the fuel tank 44. Purged fuel tank vapors first pass through canister 22 prior to exiting via CVV 114 at vent 27 so that fuel vapors can be stripped in the canister 22 reducing pollution. Opening CVV 114 may also reduce a pressure increase resulting from the refueling and thus help avoid a premature shutoff of the refueling pump.

At 410, method 400 aborts the diagnostic leak detection test. Aborting an engine-off diagnostic leak detection test may comprise one or more of opening CPV 112 and/or opening CVV 114, setting a diagnostic leak detection test abortion flag, and repeating or restarting the diagnostic leak detection test after a predetermined wait time. For example, to abort an engine-off diagnostic leak detection test or when the engine-off diagnostic leak detection test is complete, CPV 112 may be opened, fluidly connecting the fuel system to the engine intake. Furthermore, CVV 114 (or another device that restricts fluid flow in the fuel system) may alternately or also be opened, for example if a refueling event is detected while the diagnostic leak detection test is being carried out, so that air can be purged from the fuel system as fuel is dispensed into the fuel tank 44. By opening CVV 114, the increase in fuel system pressure is reduced during refueling, and the risk of prematurely stopping the refueling is decreased. Furthermore, if an engine-off diagnostic leak detection test is aborted, an indication may be provided to the vehicle control system 14. For example, a diagnostic leak detection test abortion flag may be set and/or a diagnostic leak detection test status flag may be set to off. Further still, if a diagnostic leak detection test is aborted in response to a refuel event, a refuel event flag may be set. Providing an indication to the vehicle control system 14 that a diagnostic leak detection test is aborted may prompt the controller 12 to repeat the diagnostic leak detection test. As an example, if a diagnostic leak detection test is aborted, for example due to a refueling event, controller 12 may repeat or restart the diagnostic leak detection test when refueling is completed, or after a predetermined wait time.

If the refueling condition is not satisfied, method 400 proceeds to 412 to complete the diagnostic leak detection routine, and then method 400 ends.

Figure 6:
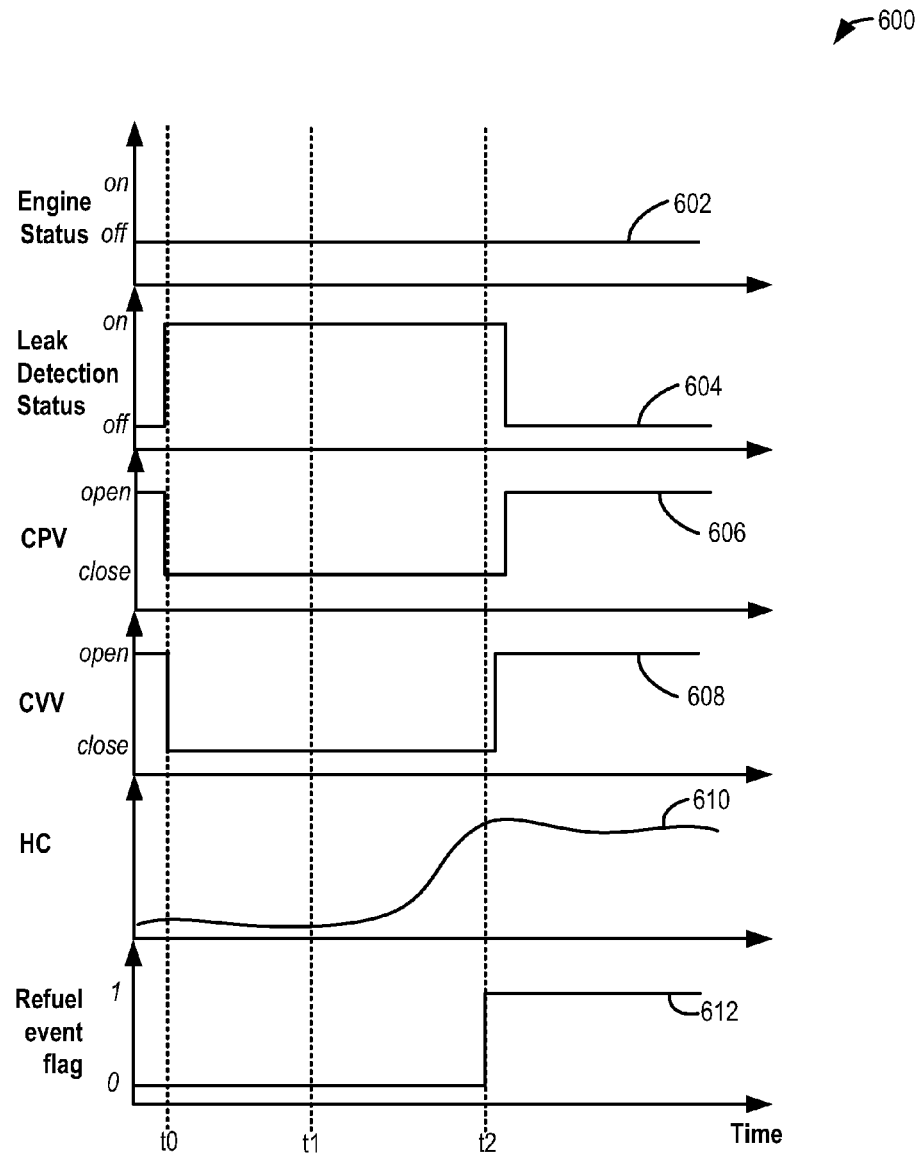
FIGS. 6-7 are timelines illustrating various operating parameters of interest.

FIG. 6 shows an example timeline 600 for detecting a refueling event during an engine-off diagnostic leak detection test, as may be observed during the execution of method 400 of FIG. 4. In particular, timeline 600 depicts trends of engine status 602, leak detection status 604, CPV status 606, CVV status 608, HC concentration 610, and refuel event flag 612.

At t0, during an engine-off condition, diagnostic leak detection testing status may be turned on. In response to starting diagnostic leak detection testing, CPV 112 and CVV 114 may be closed (CPV status 606 and CVV status 608) at t0 to isolate the fuel system. During a time after t0 and prior to t1, the engine status 602 is off and a leak detection status 604 is on. Prior to t1, HC concentration is low and not changing, and diagnostic leak detection testing proceeds without interruption. At t1, refueling is started, the rate of change in HC 610 begins to increase, for example above a first threshold rate (e.g., zero). In response to the rate of change in HC concentration exceeding a first threshold, the refuel condition of method 400 is satisfied. Accordingly, a refueling event is detected, and the refuel event flag 612 is set to 1 at t2. Subsequently, in response to detecting a refueling event, the diagnostic leak detection test is aborted. Aborting the diagnostic leak detection test may include opening CPV 112, opening CVV 114, and changing leak detection status 604 to off. As described above, aborting the diagnostic leak detection test may further include setting a diagnostic leak detection test abortion flag and repeating the diagnostic leak detection test after a predetermined wait time.

Figure 5:
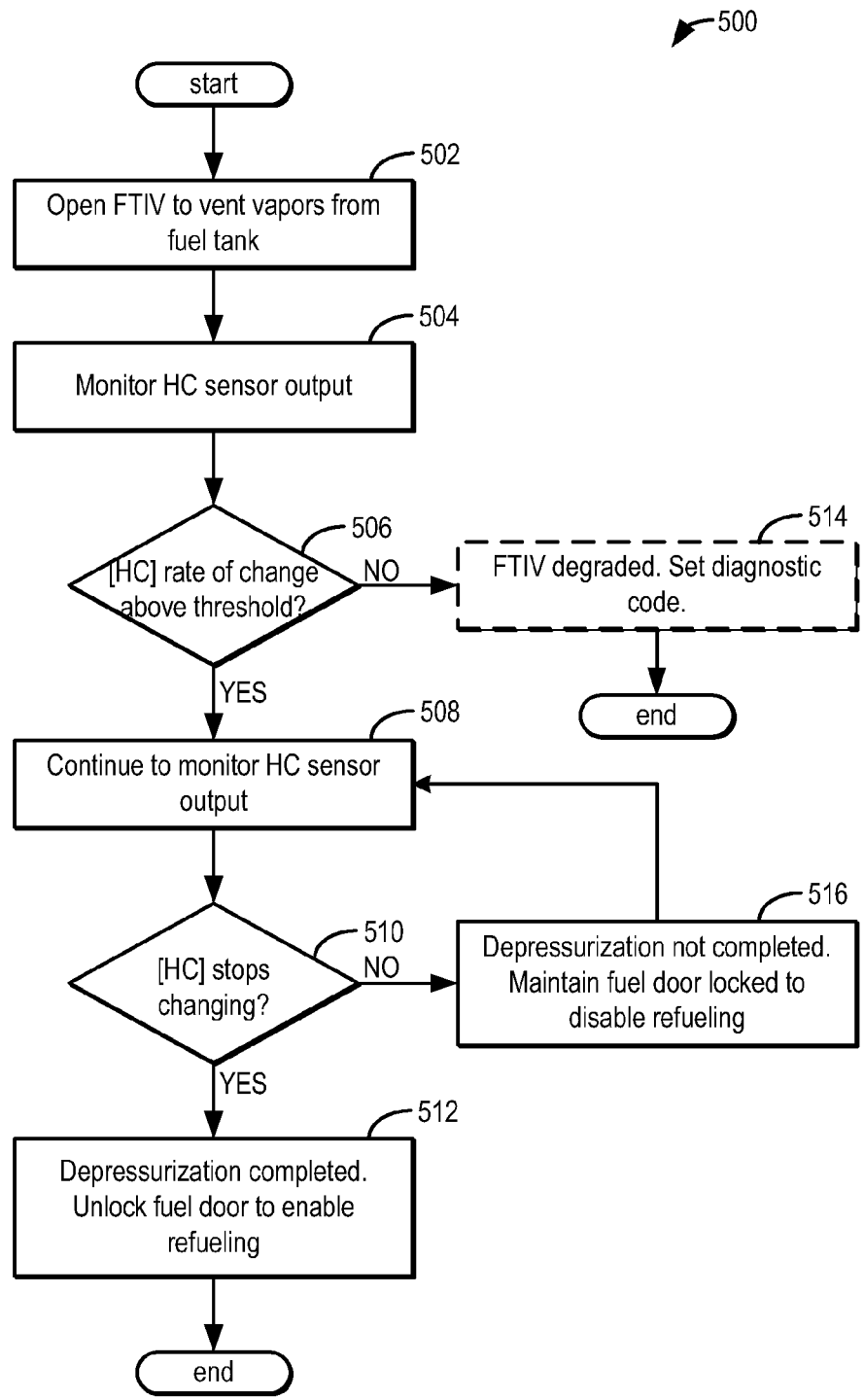

Referring back to method 300 of FIG. 3, it includes detecting a fuel tank depressurization based on output from the hydrocarbon sensor. FIG. 5 is a flow chart illustrating a method 500 for detecting a fuel tank depressurization that may be performed following the indication in method 300 that a refueling request has been received. Method 500 includes, at 502, opening the FTIV to relieve fuel tank pressure to the fuel system and/or environment. As explained previously, in response to a refueling request in a hybrid vehicle, the fuel tank may be depressurized prior to allowing an operator to perform the refill event, to prevent pressurized fuel from escaping to atmosphere. By opening the FTIV, the fuel tank is no longer sealed from the environment, and fuel vapors may begin to travel to the engine and/or environment via the fuel vapor canister.

At 504, method 500 includes monitoring hydrocarbon concentration based on output from the hydrocarbon sensor. At 506, it may be determined if the output of the HC sensor is increasing by a first threshold rate. The first threshold rate may be a suitable rate than indicates a sudden increase in the amount of hydrocarbons flowing past the HC sensor, such as greater than zero, greater than one, etc. If the output of the HC sensor does not increase by greater than a threshold amount, it may indicate that the FTIV is degraded, e.g., not able to open. Following the valve being commanded open, fuel vapors containing hydrocarbon are released from the fuel tank and flow past the HC sensor. If the HC sensor does not sense the additional hydrocarbons in the vapor flow, it may indicate that the FTIV did not open. As such, if the hydrocarbon concentration does not increase, method 500 may optionally indicate FTIV degradation and set a diagnostic code. However, other factors may influence the sensed hydrocarbon concentration, such as starting pressure of the fuel tank. For example, if a leak exists in the fuel tank, it may never build up pressure to begin with, and thus no vapor flow is present to flow past the sensor. Accordingly, rather than indicate FTIV degradation, the controller may perform additional steps to determine if other factors may be responsible for the lack of increase in the hydrocarbon concentration following the opening of the FTIV. Method 500 then returns.

If the HC sensor output indicates an increase in the hydrocarbon concentration at 506, method 500 proceeds to 508 to continue to monitor the HC sensor output. At 510, method 500 determines if the hydrocarbon concentration as determined by the HC sensor has stopped increasing (e.g., has a rate of change of zero or close to zero). If the hydrocarbon concentration has not stopped changing, method 500 proceeds to 516 to indicate fuel tank depressurization is not complete. In addition, in response to the indication that depressurization is not complete, the routine includes holding a fuel door coupled to the fuel tank locked to disable refueling. As such, the fuel door may be held locked and unlocking may be delayed until sufficient fuel tank depressurization is confirmed. Method 500 then returns to continue to monitor the HC sensor output.

If the HC sensor output has stopped changing, method 500 proceeds to 512 wherein it may be indicated that fuel tank depressurization is complete. Further, in response to the indication that the depressurization of the fuel tank is complete, the fuel door may be unlocked to enable refueling. The vehicle operator may then open a fuel cap and refill fuel from an external fuel source into the fuel tank. Method 500 then ends.

Figure 7:
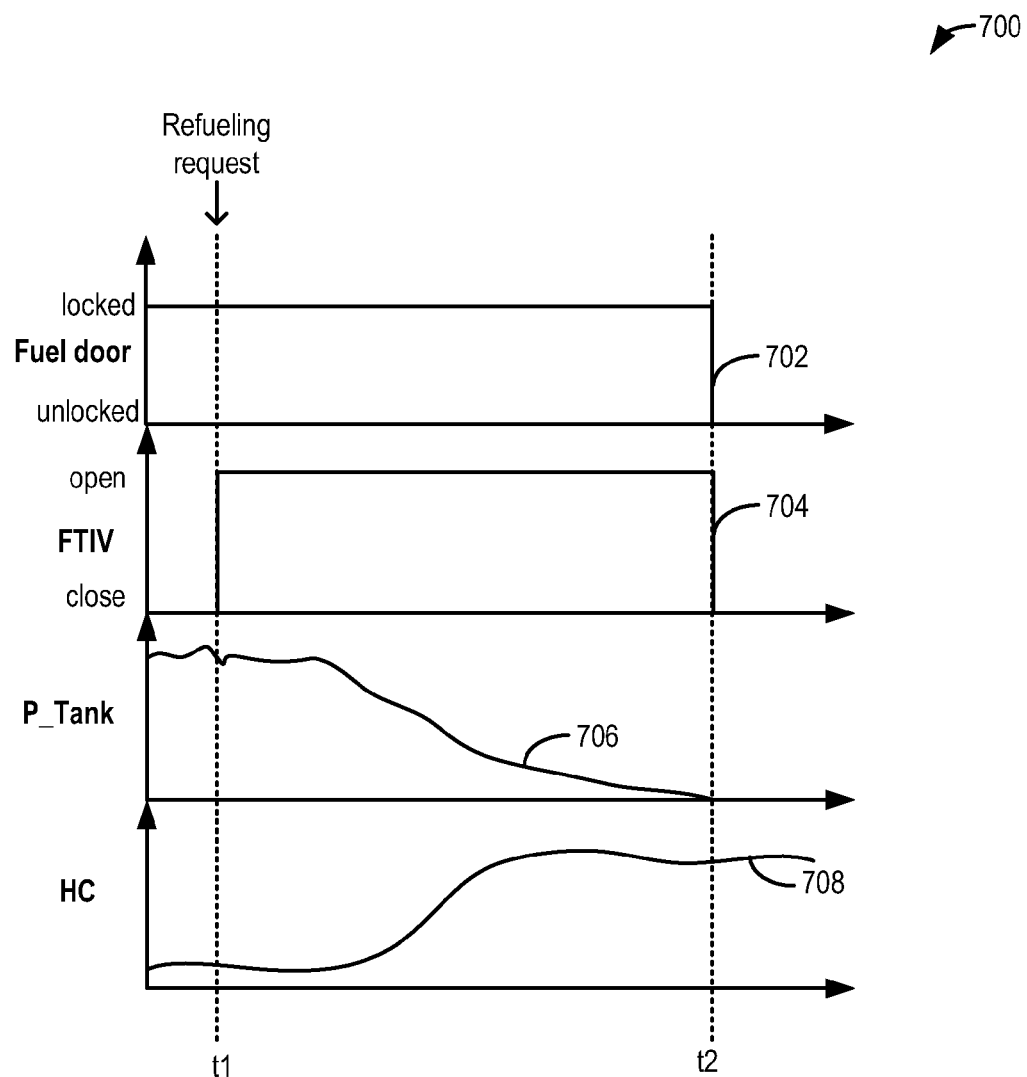

Now turning to FIG. 7, timeline 700 depicts an example fuel tank depressurization operation following a refueling request in a hybrid vehicle system. Timeline 700 depicts the locking/unlocking of a fuel door coupled to the fuel tank at 702, opening/closing of a fuel system FTIV at 704, fuel tank pressure at 706, and the output of a HC sensor coupled between the fuel tank and the fuel vapor canister at 708.

Prior to t1, the vehicle may be operating in an engine mode or electric mode with various diurnal cycle temperatures. During the vehicle operation, a fuel system purge valve (CPV) and isolation valve (FTIV) may be held closed to contain diurnal fuel tank vapors in the fuel tank. As a result, prior to t1, an elevated fuel tank pressure condition may be present (706). For example, the fuel tank pressure may be 88 in $H_2O$. As such, the vehicle may be operated with the fuel door closed to reduce fuel vapor emissions to the atmosphere.

At t1, an operator request for refueling may be received. Specifically, an operator may request refueling by pressing a refuel button on the vehicle dashboard. Due to the presence of elevated fuel tank pressure, tank depressurization may be required prior to unlocking the fuel door and enabling refueling. Specifically, in response to the operator request for refueling, at t1, the controller may open the FTIV, at 704, to divert the fuel tank vapors to the canister.

In response to the adjustment of the fuel system valves, the excess fuel tank pressure may be directed into the canister. As fuel vapors flow from the fuel tank to the canister, the flow is detected by an HC sensor. Thus, as fuel vapors enter from the fuel tank into the canister, a fuel tank pressure may decrease (706) enabling fuel tank pressure relief. At the same time, a corresponding increase in hydrocarbon concentration, followed by a leveling off of the detected hydrocarbon concentration, is observed (708). In other words, depressurization of the fuel tank may be inferred based on the change in hydrocarbon concentration (where an increased rate of change of HC concentration indicates initiation of depressurization and a leveling off of the HC concentration indicates depressurization is complete).

In the depicted example, fuel tank depressurization being in process is indicated based on a transient change or flux in HC between t1 and t2. Shortly before t2, fuel tank pressures may stabilize at or near ambient temperatures. As the fuel tank pressure stabilizes, flow of hydrocarbons through the HC sensor may also reduce and the sensor output may correspondingly also stabilize. Thus, at t2, in response to stabilization of the HC sensor output, it may be inferred that fuel tank depressurization has occurred and that it is safe to unlock the fuel door. Accordingly, at t2, the fuel door may be unlocked and the vehicle operator may be able to refill the fuel tank.

It will be appreciated that a controller may also concurrently receive a fuel tank pressure estimate from a pressure sensor coupled to the fuel tank, and indicate degradation of the pressure sensor based on the fuel tank pressure estimate relative to the output of the HC sensor. For example, degradation of the pressure sensor may be indicated if the fuel tank pressure estimate is lower than a first threshold pressure when the output of the HC sensor is higher than a second threshold concentration. Thus, based on differences between the output of the fuel tank pressure sensor and the output of the HC sensor, degradation of the fuel tank pressure sensor may be determined.

In this way, an existing HC sensor may be advantageously used in a secondary, back-up method to confirm fuel tank pressurization during a refueling event. By using existing engine hardware to confirm fuel tank depressurization, component reduction benefits are achieved while increasing the reliability of depressurization data. In addition, depressurization can be confirmed even when a fuel tank pressure sensor is degraded. By delaying unlocking of the fuel door until fuel tank pressure stabilization is confirmed, the release of fuel tank hydrocarbons into the air is reduced. In addition, the vehicle operator may be protected from fuel spray.

Thus, the methods described herein provide for a method comprising performing an action responsive to a fuel event indicated based on output from a hydrocarbon sensor positioned between a fuel tank and a fuel vapor canister.

The method may further comprise initiating a fuel system leak detection routine responsive to an engine-off event. Performing an action responsive to a fuel event may comprise aborting the fuel system leak detection routine responsive to a fuel tank fill event. The fuel tank fill event may be indicated when a hydrocarbon concentration in vapor flow from the fuel tank to the fuel vapor canister as measured by the hydrocarbon sensor increases by a threshold amount.

Initiating the fuel system leak detection routine may comprise sealing the fuel system off from atmosphere and comparing a change in pressure in the fuel system to an expected change in pressure. The fuel system as used herein may include the fuel tank, fuel vapor canister, and conduits leading from the fuel tank to the canister and from the canister to the atmosphere and/or engine. To seal the fuel system off from atmosphere, the canister vent valve may be closed as well as any other valves that couple the fuel system to atmosphere.

The method may further comprise, if a fuel tank fill event is detected prior to a fuel system leak detection routine being initiated, delaying the fuel system leak detection routine until output from the hydrocarbon sensor indicates the fuel tank fill is complete.

In an example, performing an action responsive to a fuel event comprises unlocking a fuel door responsive to completion of a fuel tank depressurization. Unlocking the fuel door responsive to completion of the fuel tank depressurization indicated based on output from the hydrocarbon sensor may comprise commanding open a fuel tank isolation valve positioned between the hydrocarbon sensor and the fuel tank; indicating initiation of depressurization of the fuel tank when a hydrocarbon concentration in vapor flow from the fuel tank to the fuel vapor canister changes by a first threshold rate; and indicating completion of the depressurization of the fuel tank when the hydrocarbon concentration changes by less than a second threshold rate. The fuel tank isolation valve may be commanded open in response to the refueling request.

In another embodiment, a method for a fuel system coupled to an engine, the fuel system comprising a fuel tank and a fuel vapor canister, comprises responsive to initiation of an engine-off fuel system leak detection test, measuring a hydrocarbon concentration of a vapor flow between the fuel tank and the fuel vapor canister with a hydrocarbon sensor; and in response to a rate of change in the hydrocarbon concentration being greater than a threshold rate, aborting the engine-off fuel system leak detection test.

The method may further comprise, in response to the rate of change in the hydrocarbon concentration being less than the threshold rate, performing the engine-off fuel system leak detection test by sealing the fuel system off from atmosphere and comparing a change in pressure to an expected change in pressure.

The method may further comprise, when the engine is operating in a fuel vapor storage mode, closing a canister purge valve and opening a canister vent valve to route fuel vapors from the fuel tank to the fuel vapor canister. When the engine is operating in a fuel vapor purge mode, a canister purge valve and a canister vent valve may each be opened to draw fresh air into the canister and route hydrocarbons stored in the fuel vapor canister to the engine.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
   unlocking a fuel door responsive to completion of depressurization of a fuel tank indicated based on output from a hydrocarbon sensor positioned in a line which couples the fuel tank with a fuel vapor canister.

2. The method of claim 1, further comprising initiating a fuel system leak detection routine responsive to an engine-off event, and aborting the fuel system leak detection routine responsive to a fuel tank fill event.

3. The method of claim 2, wherein the fuel tank fill event is indicated when a hydrocarbon concentration in vapor flow from the fuel tank to the fuel vapor canister as measured by the hydrocarbon sensor increases by a threshold amount.

4. The method of claim 2, wherein initiating the fuel system leak detection routine comprises sealing the fuel system off from atmosphere and comparing a change in pressure in the fuel system to an expected change in pressure in the fuel system.

5. The method of claim 2, further comprising, if the fuel tank fill event is detected prior to the fuel system leak detection routine being initiated, delaying the fuel system leak detection routine until output from the hydrocarbon sensor indicates the fuel tank fill event is complete.

6. The method of claim 1, wherein unlocking the fuel door responsive to completion of the fuel tank depressurization indicated based on output from the hydrocarbon sensor comprises:
   commanding open a fuel tank isolation valve positioned between the hydrocarbon sensor and the fuel tank;
   indicating initiation of depressurization of the fuel tank when a hydrocarbon concentration in vapor flow from the fuel tank to the fuel vapor canister changes by a first threshold rate; and
   indicating completion of the depressurization of the fuel tank when the hydrocarbon concentration changes by less than a second threshold rate.

7. The method of claim 6, wherein the fuel tank isolation valve is commanded open in response to a refueling request.

8. A fuel system, comprising:
   a fuel tank storing fuel for an engine;
   a fuel vapor canister coupled to the fuel tank via a conduit;
   a hydrocarbon sensor positioned in the conduit between the fuel tank and the fuel vapor canister; and
   a controller storing non-transitory instructions to perform an action responsive to a fuel event indicated based on output from the hydrocarbon sensor.

9. The fuel system of claim 8, further comprising a canister purge valve coupling the fuel vapor canister to an intake manifold of the engine and a canister vent valve coupling the fuel vapor canister to atmosphere, and wherein the controller stores further instructions to perform a fuel system leak detection test by closing the canister vent valve and the canister purge valve and monitoring a subsequent change in fuel system pressure, wherein the hydrocarbon sensor is external to the fuel tank and external to the fuel vapor canister, but senses hydrocarbons in the conduit between the fuel tank and the fuel vapor canister.

10. The fuel system of claim 9, wherein the controller stores further instructions to, after the fuel system leak detection test is initiated, abort the fuel system leak detection test responsive to the fuel event.

11. The fuel system of claim 10, wherein the fuel event is a fuel tank fill event, and wherein the controller stores further instructions to indicate the fuel tank fill event is occurring when output from the hydrocarbon sensor indicates a hydrocarbon concentration in vapor flow from the fuel tank to the fuel vapor canister has increased by a threshold amount.

12. The fuel system of claim 9, wherein the action is opening a fuel door, and wherein the fuel event is completion of a fuel tank depressurization.

13. The fuel system of claim 12, further comprising:
   a fuel tank isolation valve positioned in the conduit between the fuel tank and the hydrocarbon sensor; and
   a refuel button on a vehicle dashboard for receiving an operator request for refueling.

14. The fuel system of claim 13, wherein the controller stores instructions to:
   in response to the operator request for refueling, command open the fuel tank isolation valve; and
   delay unlocking of the fuel door until an indication of the fuel tank depressurization being completed is received.

15. The fuel system of claim 14, wherein the fuel tank depressurization being complete is indicated based on a hydrocarbon concentration in vapor flow from the fuel tank to the fuel vapor canister measured by the hydrocarbon sensor changing by a first threshold rate and then changing by less than a second threshold rate.

16. A method for a fuel system coupled to an engine, the fuel system comprising a fuel tank and a fuel vapor canister, comprising:
   responsive to initiation of an engine-off fuel system leak detection test, measuring a hydrocarbon concentration of a vapor flow between the fuel tank and the fuel vapor canister with a hydrocarbon sensor;
   determining a rate of change in the hydrocarbon concentration; and in response to the rate of change in the hydrocarbon concentration being greater than a threshold rate, aborting the engine-off fuel system leak detection test.

17. The method of claim 16, further comprising in response to the rate of change in the hydrocarbon concentration being less than the threshold rate, performing the engine-off fuel system leak detection test by sealing the fuel system off from atmosphere and comparing a change in pressure in the fuel system to an expected change in pressure in the fuel system.

18. The method of claim 16, further comprising, when the engine is operating in a fuel vapor storage mode, closing a canister purge valve and opening a canister vent valve to route fuel vapors from the fuel tank to the fuel vapor canister, and wherein aborting the test includes aborting the test after partially performing the test and without finishing performing the test.

19. The method of claim 16, further comprising, when the engine is operating in a fuel vapor purge mode, opening a canister purge valve and opening a canister vent valve to draw fresh air into the canister and route hydrocarbons stored in the fuel vapor canister to the engine.

\* \* \* \* \*